United States Patent [19]

Delaruelle et al.

[11] Patent Number: 5,276,827
[45] Date of Patent: Jan. 4, 1994

[54] DATA BUFFER FOR THE DURATION OF CYCLICALLY RECURRENT BUFFER PERIODS

[75] Inventors: Antoine Delaruelle; Jozef L. Van Meerbergen; Cornelis Niessen; Owen P. McArdle, all of Eindhoven, Netherlands

[73] Assignee: U.S. Philips Corporation, New York, N.Y.

[21] Appl. No.: 527,997

[22] Filed: May 22, 1990

[30] Foreign Application Priority Data

Jun. 28, 1989 [NL] Netherlands .................. 8901631

[51] Int. Cl.⁵ .................. G06F 12/00; G06F 11/10; H03M 13/00
[52] U.S. Cl. .................. 395/400; 371/37.5; 371/37.7
[58] Field of Search .......... 395/400; 371/37.5, 40.1, 371/37.4, 37.7, 37.8; 84/602, 604, 605, 606, 607

[56] References Cited

U.S. PATENT DOCUMENTS

| | | | |
|---|---|---|---|
| 4,281,355 | 7/1981 | Wada et al. | 371/37.4 X |
| 4,333,160 | 6/1982 | Kobari et al. | 395/425 |
| 4,413,340 | 11/1983 | Odaka et al. | 371/38.1 X |
| 4,562,578 | 12/1985 | Odaka et al. | 371/37.2 |
| 4,618,942 | 10/1986 | Tomimitsu | 395/400 |
| 4,852,101 | 7/1989 | Kobayashi et al. | 371/37.5 |
| 4,868,827 | 9/1989 | Yamada et al. | 371/37.5 |
| 5,060,221 | 10/1991 | Sako et al. | 371/37.4 |

FOREIGN PATENT DOCUMENTS

| | | |
|---|---|---|
| 55-38617 | 3/1980 | Japan . |
| 217565 | 10/1985 | Japan . |
| 86-03911 | 7/1986 | PCT Int'l Appl. . |

OTHER PUBLICATIONS

Hirota et al, "LSIs for Digital Signal Processing Based on a PCM Format," Journal of the Audio Engineering Society, vol. 31 (1983), No. 7/8.
Farhangi et al., "A CD-ROM Data Retriever IE," IEEE Transactions on Consumer Electronics CE 32, No. 4, Nov. 1986, pp. 769–775.
K. Pohlmann, "The Compact Disc Formats: Technology and Applications", J. Audio Eng. Soc., vol. 36, No. 4, Apr. 1988, pp. 250–287.

Primary Examiner—Joseph L. Dixon
Assistant Examiner—Michael A. Whitfield
Attorney, Agent, or Firm—Leroy Eason

[57] ABSTRACT

A buffer memory device comprising memory locations for successively storing successive groups of data units, the successive groups being presented during successive phases, the data units in each group having different buffer periods which are recurrent for all groups. A modulo address generator generates, for each group of data units, a series of addresses for selected locations in a memory wherein the data units will be stored, there being logic address intervals between the successive addresses in the relevant series which correspond to the buffer periods of the respective data units. In every two successive series the memory addresses are shifted by one address interval unit with respect to each other. An efficient data occupation of the memory can thus be realized with simple addressing, since the write addresses during any phase can be used as the read addresses for already stored data units. The buffer device can be used as an interleaver or de interleaver for error correction in CD apparatus.

14 Claims, 5 Drawing Sheets

(i) $a_k := a_{k-1} + c_1$ (ii) $b_k := b_{k-1} + a_k + c_2 = b_{k-1} + a_{k-1} + c_1 + c_2$ (iii) $a_k = a_0 + k c_1$ (iv) $\sum_{j=1}^{k} b_j - \sum_{j=1}^{k} b_{j-1} = \sum_{j=1}^{k} (a_{j-1} + c_1 + c_2) \Longleftrightarrow$ $b_k - b_0 = \sum_{j=1}^{k} (a_0 + j c_1 + c_2)$ (v) $b_k = b_0 + k(a_0 + c_2) + \frac{1}{2} k(k+1) c_1$

5,276,827

DATA BUFFER FOR THE DURATION OF CYCLICALLY RECURRENT BUFFER PERIODS

BACKGROUND OF THE INVENTION

1. Field of the Invention

The present invention relates to a data buffer having memory locations for the buffering of successive groups of data units, presented during successive phases, for the duration of buffer periods which are recurrent for each group.

2. The Related Art

An example of a general device of this type forms a portion of a compact disc player including encoders and decoders for error correction, as outlined in: "The Compact Disc Formats: Technology and Applications", K. Pohlmann, J. Audio Eng. Soc., Vol. 36, No. 4, April 1988, pages 250-287. The encoders as well as the decoders are based on the "cross-interleaved Reed-Solomon code"; to this end, each encoder and decoder comprises a so-called "interleaver" having twenty-eight delay lines for respectively delaying a corresponding number of data units, each for the duration of a mutually different buffer period.

Preferably, a buffer device of this kind is constructed so as to require as small a memory as possible. Furthermore, the addressing of the memory is preferably as simple as possible in view of the computing capacity required for control of the device. Therefore, it is inter alia an object of the invention to provide a buffer device of the kind described which offers more efficient memory use and is simple to address.

SUMMARY OF THE INVENTION

A buffer device in accordance with the invention comprises a modulo address generator for generating, for each group of data units, a series of addresses for the selection of locations in a memory whereat the data units are respectively to be stored, there being respective logic address intervals between successive addresses in the relevant series, which intervals correspond to the respective buffer periods for respective data units. The addresses in every two successive series are shifted by one address interval unit with respect to one another. The invention utilizes the mapping of buffer periods onto address intervals in a current series of addresses, in order to access the data units stored in selected memory locations. The address interval between every two consecutive addresses within a given series is indicative of (for example, numerically equal to) the buffer period assigned to the data unit at the highest (or the lowest) of such addresses in relation to the data unit at the other of such addresses.

It is to be noted that a data unit is to be understood to be used herein to mean a data entity (a bit, a byte, a record, a file, etc.) which is considered to form one unit at least for the purpose of buffering. Successive series are shifted one address interval unit with respect to one another. This implies that the same address of a twosome in a series of addresses selected during a previous series is selected again in a later series only if the total shift has covered the original address interval. However, because the original address interval is related to the relevant buffer period, the address has already become available for new data after the relevant last read operation.

Using the above addressing, the write operations will involve exactly the same memory locations as those in which data groups from preceding phases have already completed their buffer period. Therefore, the addresses generated by the address generator for the writing of a current group of data units are preferably also used as read addresses of a previous group before writing the current group. It is advantageous to execute a read operation for each current address and subsequently a write operation. The switching between reading and writing per address is simpler and cheaper than generating twice a series of addresses for the successive reading and subsequent successive writing of the selected locations. The current addresses could alternatively be buffered in a separate memory, but that would consume memory space.

An illustrative embodiment of a device in accordance with the invention is characterized in that each respective buffer period amounts to a respective first number of successive write phases, the address interval associated with any buffer period amounting to a respective second number of address interval units, the first number being equal to the second number. The address intervals are then as small as possible, so that the number of memory locations required is minimum. This number is equal to the sum of the buffer periods which are assigned to each group, and which are expressed as the relevant number of phases.

A larger memory can be used in order to choose address intervals within a series which are larger than the shortest possible address intervals as just described. Therefore, another illustrative embodiment of a device in accordance with the invention is characterized in that each respective buffer period amounts to a respective first number of successive write phases, the address interval associated with the respective buffer period amounting to a respective second number of address interval units, the second number being equal to the sum of the respective first number and a respective offset. Even though this results in a less dense occupation of the memory, for addressing one memory location at the most one read operation or one write operation need then be executed per phase, thus simplifying the control. Preferably, the number of memory locations used is chosen to be equal to an integer power of two, because digital circuits operate better on binary numbers, for example in respect of the modulo operation, than on numbers represented on a basis other than binary.

It is to be noted that a device in accordance with the invention may serve not only as an interleaver or deinterleaver in a CD player, but also more generally for parallel cyclical data processing operations. In the latter case, parallel streams of successive data are transformed so as to form new streams of successive data. Before the data of the new streams is processed again, data from the different streams need be delayed with respect to one another in order to ensure that this data can be correctly combined at the correct instant.

BRIEF DESCRIPTION OF THE DRAWING

The invention will be described in detail hereinafter with reference to the drawings; wherein:

FIG. 1 provides a first example of a data occupation in a memory device in accordance with the invention;

FIG. 2 demonstrates a second example of a data occupation;

FIG. 3 shows a third example of a data occupation;

DETAILED DESCRIPTION OF THE PREFERRED EMBODIMENTS

FIRST EXAMPLE OF A DATA OCCUPATION

Figure 1:
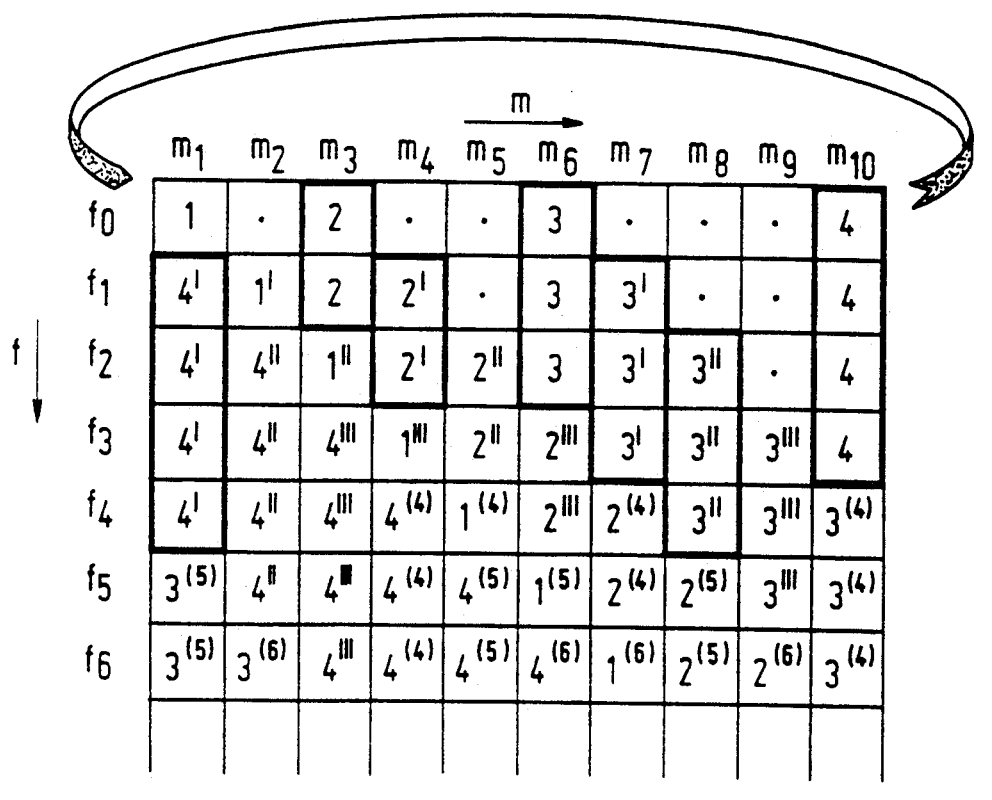
Figure 4:
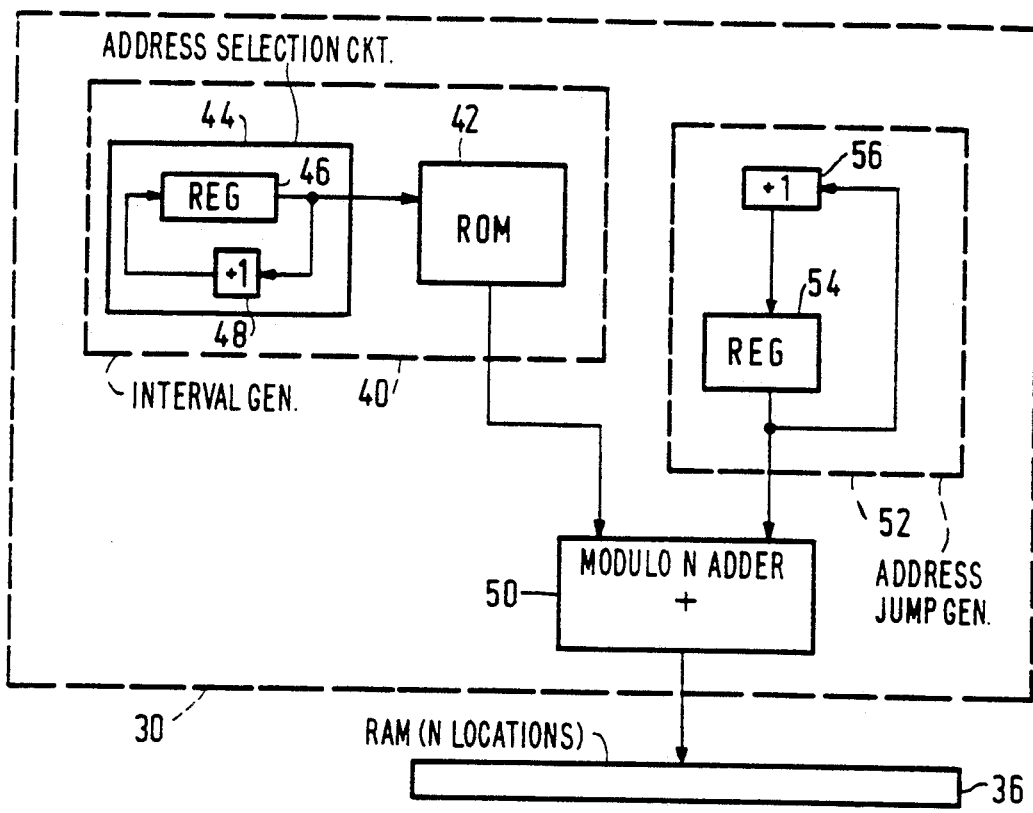
FIG. 4 presents a first illustrative embodiment of an address generator subtle for use in an arrangement in accordance with the invention.

FIG. 1 shows a first example of data occupation by using a device in accordance with the invention. The addresses $m_1$ to $m_{10}$ of ten memory locations are plotted sequentially in the horizontal direction. The successive phases $f_0, f_1, f_2 \ldots f_6, \ldots$, in which respective series of current data is written after the relevant already stored data has been read for the previous series, are plotted in the vertical direction. In phase $f_0$, data is written denoted by 1, 2, 3, and 4 to which there is assigned a buffer period equal to one phase, two phases, three phases and four phases, respectively. Consequently, each of these data will remain stored in the memory for the duration of the relevant buffer period. The occupation of memory addresses during the phase $f_0$ is chosen as follows. Data unit 1, which is to be buffered for a buffer period of one phase, is written at the address $m_1$. Data unit 2, which is to be buffered for a buffer period of two phases, is written at an address which is situated at an address interval which is two address interval units from the preceding address $m_1$. This number of address interval units equals the number of phases in the buffer period assigned to the data unit 2. Thus, the relevant address is the address $m_3$. Data unit 3 will be buffered for three phases, so that it is written at a next address $m_6$ which is situated at three address interval units from the preceding address $m_3$. Data unit 4 will be buffered for four phases and hence will be written at the address $m_{10}$ which deviates from the address $m_6$ by four address interval units. The total number of memory locations equals the sum of the buffer periods assigned per phase, that is to say ten.

During the phase $f_1$ there are written a new series of data units 1', 2', 3' and 4' which are to be buffered for the duration of one, two, three and four phases, respectively. Each of the addresses of the memory locations in which the new data units are written has been shifted one address interval unit with respect to the address at which the data unit having the same buffer period has been written during the preceding phase. The data units 1', 2', 3' and 4' are therefore written at the addresses $m_2$, $m_4$, $m_7$ and $m_1$. The data unit 4' is thus written in the location from which the data unit 1 has just been read.

During the phase $f_2$ data units 1", 2", 3" and 4" are written, buffer periods of one, two, three and four phases, respectively, being assigned thereto. The write addresses are again shifted one address interval unit with respect to the write addresses of the preceding series of data units. Thus, the data unit 1" is written in the location having the address $m_3$ where the data unit 2 which had been stored during phase $f_0$ has just been read for the last time. The data units 2" and 3" are written at the addresses $m_5$ and $m_8$. The data unit 4" is written at the address $m_2$ where the data unit 1' has just been read.

During the phase $f_3$ data units 1''', 2''', 3''' and 4''' are written at the addresses $m_4$, $m_6$, $m_9$ and $m_3$. The data units 1''', 2''', 3''' and 4''' are written in the memory locations which have just been vacated because the buffer period of the relevant previous data units has elapsed. The drawing also shows the new data units of subsequent phases $f_4$, $f_5$ and $f_6$. Because the numbers of address interval units between the addresses of a current group of data units are equal to the relevant numbers of buffer period phases, the successive groups can be interleaved in the manner shown. Consequently, a dense memory occupation is realised with systematic, simple addressing.

SECOND EXAMPLE OF A DATA OCCUPATION

Figure 2:
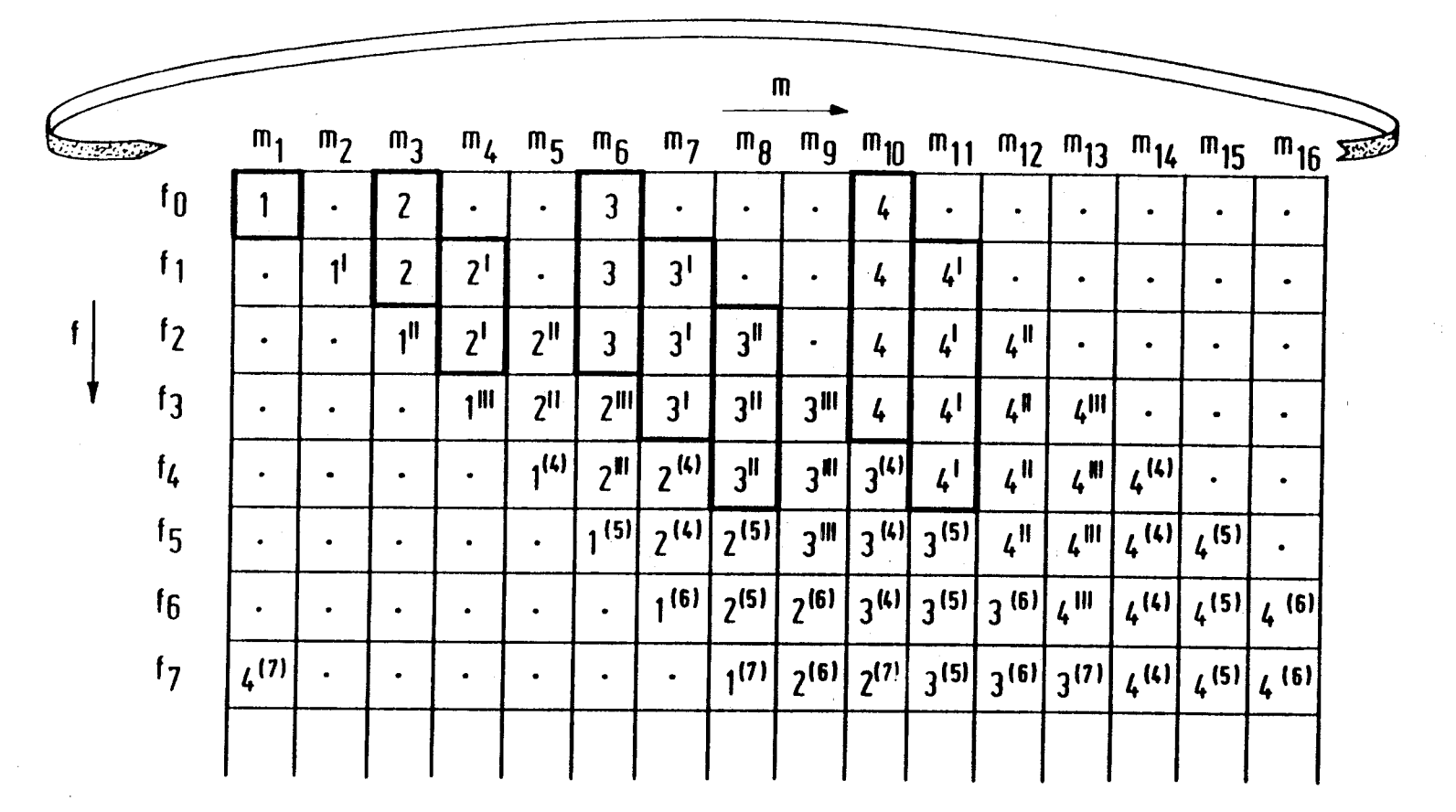

FIG. 2 provides a second example of data occupation in a memory having more locations than strictly necessary. The notation used in FIG. 2 corresponds to that of FIG. 1. The present memory comprises sixteen memory locations having the addresses $m_1$ to $m_{16}$. After a data unit has reached the last address, in this case the data unit $4^{(6)}$ written in phase $f_6$, the corresponding data unit, in this case $4^{(7)}$, of the next group, phase $f_7$, is placed at the first address $m_1$ because of the modulo-16 operation of the address generator. Even though the occupation is not optimum in respect of the capacity of the memory, it offers the advantage that the addressing is simpler when the number of memory locations used is a power of two. In digital circuits, it is easier to utilize powers of two than other number bases.

THIRD EXAMPLE OF A DATA OCCUPATION

Figure 3:
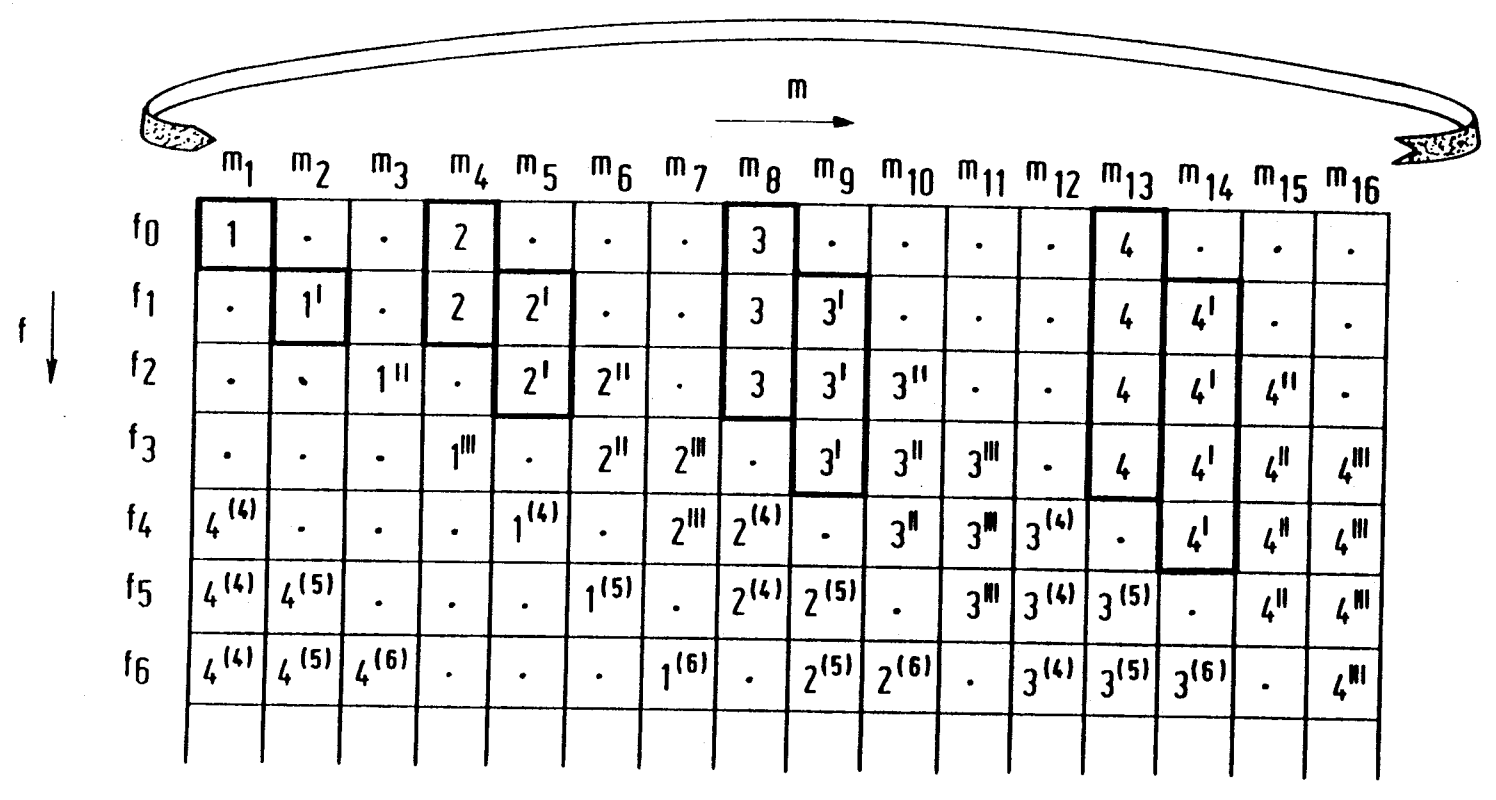

FIG. 3 shows a third example of data occupation in a memory wherein the number of memory locations is larger than strictly necessary. The notation used in FIG. 3 again corresponds to that of the preceding Figures. Each of the address intervals is numerically equal to the relevant buffer periods plus a constant offset which is in this case equal to one address interval unit for all buffer periods. The address interval between two current, successive addresses (for example, the addresses $m_6$ and $m_{10}$ in the phase $f_2$) is now larger than the associated buffer period (amounting to three phases for the data unit 3" in the present example). Consequently, a dummy phase occurs between the reading of an address for the last time and the writing at the same address (the phase $f_5$ is a dummy phase for the memory location $mm_{10}$). This creates the possibility of distributing read operations and write operations relating to one and the same memory location between phases so that, for example, simpler or slower control can suffice. In the preceding Figures the lengths of the buffer periods have been chosen to be consecutive merely by way of example. It will be evident that similar occupations of the memory can be realised by making a different choice as regards the buffer periods. Moreover, the offsets associated with each of the addresses in FIG. 3 are chosen to be mutually equal by way of example. The user is free to choose mutually different offsets. The off-sets could be chosen, for example so that either only the even or only the odd addresses are concerned in each phase of a write operation or a read operation. When a sub-group of the addresses having a predetermined property (for example, even/odd) is accessed in each phase, the memory can be constructed to be simpler, smaller or faster. For example, a sense amplifier can be provided for an odd and an even column in an integrated memory circuit. Similarly, the offsets can be used to control the spread in the occupation of the memory locations.

FIRST ILLUSTRATIVE EMBODIMENT OF AN ADDRESS GENERATOR

FIG. 4 depicts a first illustrative embodiment of an address generator suitable for use in a device in accordance with the invention and which comprises N memory locations. During each phase, the address generator 30 selects the addresses of locations in memory 36 which have address intervals in accordance with the relevant buffer periods. The address sequences generated for every two successive phases deviate from on another by one address interval unit. The address intervals in a given sequence are determined by the interval generator 40. The interval generator 40 comprises a memory 42, for example a ROM, having addresses to be referred to hereinafter as ROM-addresses, for storing thereat the addresses for selected locations in memory 36, to be referred to hereinafter as RAM-addresses, for generating a RAM address reference series. Using an address selection circuit 44, the ROM addresses are successively accessed. To this end, the selection circuit 44 comprises, for example a register 46 which cyclically accesses the ROM addresses via an incrementation unit 48. The output of the interval generator 40 is coupled to an input of a modulo-N adder 50. The other input of the modulo-N adder 50 is coupled to the output of a jump generator 52 which calculates, for each subsequent series, the shift by one address interval unit and performs a modulo calculation of the number of memory locations used. To this end, the jump generator 52 comprises, for example, a register 54, an output of which is fed back via an incrementation unit 56. Thus, for each phase there is generated a step reference value which is added to the address values from the ROM 42 in the modulo-N adder 50. The reference value is calculated modulo-N. Thus, a current RAM address series is generated from the reference series and the step value.

SECOND ILLUSTRATIVE EMBODIMENT OF AN ADDRESS GENERATOR

Figure 5:
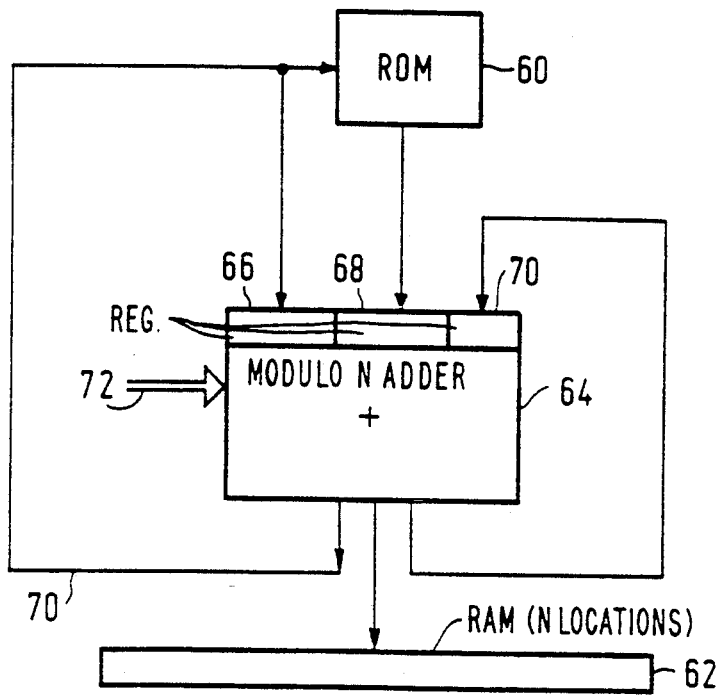
FIG. 5 shows a second embodiment of an address generator.

FIG. 5 illustrates a second embodiment of an address generator suitable for use in a device in accordance with the invention which comprises N memory locations. The address generator comprises a memory 60, for example a ROM, in which the RAM addresses of a reference series for N locations in memory 62 are stored at successive ROM addresses. The address generator also comprises a programmable modulo-N adder 64 which is used for the calculation of the ROM addresses, the RAM addresses and the step value of subsequent RAM address series with respect to the reference series, analogously to the calculation performed in the address generator described with reference to FIG. 4. The advantages of this circuit includes the saving of chip surface area in an implementation in the form of an integrated circuit, because the same circuit is used for several operations. The programmable modulo-N adder 64 is coupled to three registers 66, 68 and 70 at the input side. Under the control of a first control signal on a control bus 72, a first increment is added to the contents of the register 70, the sum being buffered again in the register 70. The contents represent the current step value as discussed with reference to FIG. 4. Under the control of a second control signal on the control bus 72, the adder 64 adds a second increment to the contents of the register 66. This sum represents the current ROM address for accessing the ROM 60 in which the reference series is stored as previously described with reference to FIG. 4. When the ROM 60 is accessed by way of the relevant sum, acting as the ROM address, the contents of this ROM address are loaded into the register 68. Under the control of a third control signal on the control bus 72, the contents of the register 68 (being the reference address) and the contents of the register 70 (being the current step value) are summed. The result represents a current RAM address for selecting one of the memory locations of the memory 62.

THIRD ILLUSTRATIVE EMBODIMENT OF AN ADDRESS GENERATOR

Figures 6, 7:
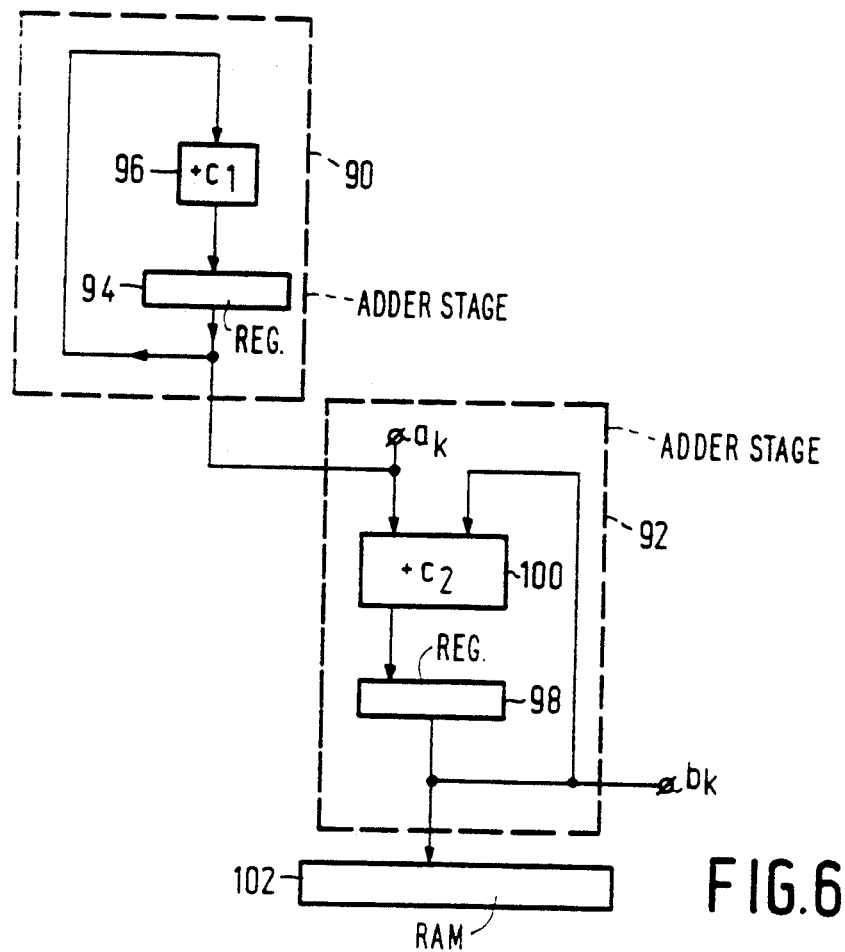
FIG. 6 shows a third embodiment of such an address generator.
FIG. 7 presents mathematical relationships supporting the operation of the address generator shown in FIG. 6.

FIG. 6 presents a third illustrative embodiment of an address generator suitable for a device in accordance with the invention. The address generator is constructed as a cascade of adders. A cascade having two adder stages 90 and 92 is shown. For the reference series the relevant addresses for the memory locations in a RAM are stored in a separate ROM memory in the previous embodiments. In the present embodiment, all RAM addresses are calculated by the address generator. The first stage 90 comprises a register 94 whose output is coupled to the input via an adder circuit 96. The adder circuit adds a first constant $C_1$ to the preceding register contents and delivers this sum as the new register contents. The second stage 92 includes a register 98 whose output is fed back to an adder circuit 100. The adder circuit 100 adds the current register contents of the register 94 plus a second constant $C_2$ to the previous register contents of the register 98. The new contents of the register 98 then represent an address for selection of locations in a RAM 102.

MATHEMATICAL RELATIONSHIPS FOR EXPLAINING THE ADDRESS GENERATOR OF FIG. 6

The operation of the illustrative embodiment of the address generator shown in FIG. 6 will be illustrated on the basis of the relationships set out in FIG. 7. Formula (i) represents the recursive relation applicable to the output quantity $a_k$ of the stage 90 for the $k^{th}$ iteration. Formula (ii) represents the output quantity $b_k$ of the stage 92, again for the $k^{th}$ iteration. It can be simply demonstrated that the formula (iii) represents the output quantity $a_k$, expressed in the number of iterations k, the starting quantity $a_o$ in the register 94, and the first constant $c_1$. By forming the difference between two partial sums in relation to $b_k$, as in the formula (iv), a simple expression (v) can also be derived for the output quantity $b_k$ in dependence on the number of iterations k, the starting quantities $a_o$ and $b_o$ for the registers 94 and 98, and the constants $c_1$ and $c_2$.

Depending on the values of the parameters $a_o$, $b_o$, $c_1$ and $c_2$, an arbitrary second-degree function of k can be created. By extending the cascade with stages such as the stage 92, higher-degree functions of k can be realised.

It can be simply demonstrated that the addresses for the starting series in the phase $f_o$ in the diagram of FIG. 3 can be generated by choosing: $a_o=0$, $b_o=1$, $c_1=1$ and $c_2=2$. By resetting the contents of the register 94 to 0 and the contents of the register 98 to $b_o+1$ at the end of each phase, and by also performing a modulo-N operation for determining $b_k$, the next desired memory addresses can be generated for RAM 102. A further possibility would be the resetting of the contents of the registers 94 and 98 to $a_o$ and $b_o$, respectively, at the end of each phase and the addition of a number 1 to the result $b_k$ in a modulo-N counter.

We claim:

1. A buffer memory device for storing successive groups of data units, the successive groups being presented during successive read/write phases, the data units in each group having buffer periods respectively assigned thereto, which periods are recurrent for all groups; said device comprising:
   a read/write memory having successive addressable storage locations therein, each location having a logic address interval, the logic address intervals of successive locations differing by one address interval unit;
   a modulo address generator for generating, during each phase, a series of addresses of selected locations in said read/write memory for writing the successive data units presented during such phase, said series of addresses being such that the selected locations have different logic address intervals which correspond to the different buffer periods of the data units to be written at such locations; and
   means for shifting the addresses in each series of addresses by one address interval unit relative to the addresses in the immediately preceding series of addresses, so that the addresses for writing a presented group of data units in selected locations in said read/write memory are the same as the addresses for reading-out the data units already stored in such selected locations.

2. A device as claimed in claim 1, wherein a current address signifies the address for a read operation and a write operation which follows the read operation.

3. A device as claimed in claim 1, wherein each respective rubber period amounts to a respective first number of successive phases, the address interval associated with such buffer period amounts to a respective second number of address interval units, and the first number is equal to the second number.

4. A device as claimed in claim 1, wherein each respective buffer period amounts to a respective first number of successive phases, the address interval associated with such buffer period amounts to a respective second number of address interval unit, and the second number is equal to the sum of said first number and a respective offset.

5. A device as claimed in claim 1 wherein the address generator comprises:
   a reference address generator for generating a cyclical series of reference addresses;
   an incrementation unit for delivering, for each address in a subsequent series of addresses to be generated, an incremental step value of one address interval unit; and
   an adder for adding a current reference address and a current step value so as to derive the addresses in said subsequent series.

6. A device as claimed in claim 1 wherein the address generator comprises:
   a first incrementation unit for generating a current first number by summing a preceding first number and a first constant; and
   a second incrementation unit for generating a current second number by summing a preceding second number, the current first number, and a second constant.

7. A device as claimed in claim 1, wherein the address generator comprises:
   a reference memory for storing a series of reference addresses;
   a first register and a second register; and
   a programmable adder for executing the following operations:
      adding, under the control of a first signal, a first increment to the first register and storing the resultant first sum in the second register; and
      adding, under the control of a second signal, a second increment to the second register and storing the resultant second sum in the second register; and
      fetching, under the control of a third signal, a reference address from a location of the reference memory, which address is indicated by the current contents of the second register, and subsequently adding the reference address to the sum stored in the first register in order to generate a current address.

8. A device as claimed in claim 1, wherein the number of memory locations for buffing of all groups of data units equals an integer power of two.

9. A device as claimed in claim 1, serving as deinterleaver in a compact disc player.

10. A buffer memory as claimed in claim 1, wherein the number of memory locations available for storing said groups of data units is equal to an integer power of two.

11. A device as claimed in claim 10, wherein the address generator comprises:
    a reference address generator for generating a cyclical series of reference addresses;
    an incrementation unit for delivering, for each address in a subsequent series of addresses to be generated, an incremental step value of one address interval unit; and
    an adder for adding a current reference address and a current step value so as to derive the addresses in said subsequent series.

12. A device as claimed in claim 10, wherein the address generator comprises:
    a first incrementation unit for generating a current first number by summing a preceding first number and a first constant; and
    a second incrementation unit for generating a current second number by summing a preceding second number, the current first number, and a second constant.

13. A device as claimed in claim 10, wherein the address generator comprises:
    a reference memory for storing a series of reference addresses;
    a first register and a second register; and
    a programmable adder for executing the following operations:
       adding, under the control of a first signal, a first increment to the first register and storing the resultant first sum in the second register; and
       adding, under the control of a second signal, a second increment to the second register and storing the resultant second sum in the second register; and
       fetching, under the control of a third signal, a reference address from a location of the reference memory, which address is indicated by the current contents of the second register, and subsequently adding the reference address to the sum stored in the first register in order to generate a current address.

14. A device in accordance with claim 10, serving a deinterleaver in a compact disc player.

* * * * *